(12) United States Patent
Kishikawa

(10) Patent No.: US 9,280,927 B2
(45) Date of Patent: Mar. 8, 2016

(54) DISPLAY DEVICE, IMAGING DEVICE AND GRAY LEVEL VOLTAGE GENERATION CIRCUIT

(71) Applicant: Sony Corporation, Tokyo (JP)

(72) Inventor: Teisuke Kishikawa, Fukuoka (JP)

(73) Assignee: SONY CORPORATION, Tokyo (JP)

( * ) Notice: Subject to any disclaimer, the term of this patent is extended or adjusted under 35 U.S.C. 154(b) by 197 days.

(21) Appl. No.: 13/898,505

(22) Filed: May 21, 2013

(65) Prior Publication Data

US 2013/0321489 A1 Dec. 5, 2013

(30) Foreign Application Priority Data

Jun. 5, 2012 (JP) ................................. 2012-127863

(51) Int. Cl.
*G09G 3/22* (2006.01)
*G09G 3/20* (2006.01)
*G06F 3/042* (2006.01)

(52) U.S. Cl.
CPC .. *G09G 3/22* (2013.01); *G09G 3/20* (2013.01); *G06F 3/042* (2013.01); *G09G 2310/027* (2013.01)

(58) Field of Classification Search
CPC .......... G09G 2310/027; G09G 3/3696; G09G 2320/0276; G09G 2320/0673; G09G 3/22; G09G 3/20; G09G 2330/021; G09G 3/2007
See application file for complete search history.

(56) References Cited

U.S. PATENT DOCUMENTS

| 5,387,879 | A | * | 2/1995 | Satoh | 330/282 |
|---|---|---|---|---|---|
| 2001/0003431 | A1 | * | 6/2001 | Nakao | 327/530 |
| 2002/0036609 | A1 | * | 3/2002 | Kajihara et al. | 345/87 |
| 2002/0186230 | A1 | * | 12/2002 | Kudo et al. | 345/690 |
| 2004/0056868 | A1 | * | 3/2004 | Kato | 345/600 |
| 2006/0087483 | A1 | * | 4/2006 | Takada et al. | 345/89 |
| 2008/0012840 | A1 | * | 1/2008 | Higashino et al. | 345/204 |
| 2008/0291190 | A1 | * | 11/2008 | Kim et al. | 345/211 |
| 2009/0303219 | A1 | * | 12/2009 | Kimura et al. | 345/211 |
| 2010/0045708 | A1 | * | 2/2010 | Higashino | 345/690 |
| 2010/0156944 | A1 | * | 6/2010 | Haupt et al. | 345/690 |
| 2010/0207963 | A1 | * | 8/2010 | Lee et al. | 345/690 |
| 2010/0321362 | A1 | * | 12/2010 | Weng | 345/211 |
| 2011/0141089 | A1 | * | 6/2011 | Lee | 345/211 |
| 2011/0141098 | A1 | * | 6/2011 | Yaguma et al. | 345/212 |
| 2013/0278639 | A1 | * | 10/2013 | Liao | 345/690 |

FOREIGN PATENT DOCUMENTS

JP 2003-223153 A 8/2003

* cited by examiner

*Primary Examiner* — Larry Sternbane
*Assistant Examiner* — Ivelisse Martinez Quiles
(74) *Attorney, Agent, or Firm* — Michael Best & Friedrich LLP

(57) ABSTRACT

Disclosed herein is a display device capable of displaying an image with two or more gray levels. The display device includes: a voltage division circuit adapted to generate a plurality of voltages using a resistance division circuit; a gamma correction section adapted to gamma-correct the image using the voltages generated at division points of the resistance division circuit; an amplification circuit adapted to amplify a given voltage and supply the amplified voltage to at least one of the division points of the resistance division circuit; and an adjustment section adapted to adjust an amplification factor of the amplification circuit.

19 Claims, 12 Drawing Sheets

DISPLAY DEVICE, IMAGING DEVICE AND GRAY LEVEL VOLTAGE GENERATION CIRCUIT

BACKGROUND

The present technology relates to a display device capable of displaying a gray level image on a display section, imaging device capable of creating a gray level image of a subject, and a gray level voltage generation circuit.

In a display device such as a liquid crystal display device or an organic EL (Electro-Luminescence) display device, gamma correction is performed to correct the chroma and brightness of an image or the like to be displayed based on supplied image data. This gamma correction can be performed in a variety of manners. For example, gamma correction is performed by determining a gray level voltage for each gray level making up image data using a gray level voltage output from a gray level voltage generation circuit 400 shown in FIG. 15.

FIG. 15 illustrates an example of a gray level voltage generation circuit in related art. The gray level voltage generation circuit 400 shown in FIG. 15 includes resistance division circuits Rs1, Rs2 and Rs3 and resistance selection circuits 410 and 420. The resistance division circuits Rs1, Rs2 and Rs3 are also referred to as ladder circuits. The resistance selection circuits 410 and 420 select either one of the resistance division circuits Rs1, Rs2 and Rs3. In this configuration, one of the ladder resistors selected by the resistance selection circuits 410 and 420 is used to generate a gray level voltage for gamma correction.

Each of the resistance division circuits Rs1, Rs2 and Rs3 includes a plurality of resistors connected in series between gray level reference voltages VH and VL. In these resistance division circuits, a plurality of division points are formed between the gray level reference voltages VH and VL to generate different voltages. The resistances of the plurality of resistors are selected properly so that the voltages generated at the plurality of division points of the resistance division circuits achieve a desired gamma correction curve.

FIG. 16 illustrates examples of gamma correction curves achieved by the voltages at the division points of the resistance division circuits Rs1, Rs2 and Rs3. In the examples shown in FIG. 16, selecting the resistance division circuit Rs1 provides a gamma correction curve corresponding to γ(Rs1) shown in FIG. 16. Selecting the resistance division circuit Rs2 provides a gamma correction curve corresponding to γ(Rs2) shown in the same figure. Selecting the resistance division circuit Rs3 provides a gamma correction curve corresponding to γ(Rs3) shown in the same figure.

That is, image data is gamma-corrected in a desired manner by selecting one of the resistance division circuits Rs1, Rs2 and Rs3 and correcting the gray level voltage of each gray level of the image data using gray level voltages generated at the plurality of division points of the selected resistance division circuit.

In addition to the above, Japanese Patent Laid-Open No. 2003-223153 (hereinafter referred to as Patent Document 1) discloses a liquid crystal drive circuit that includes first and second resistance division circuits. The first resistance division circuit generates a gamma correction curve. The second resistance division circuit varies the voltage of the first resistance division circuit at a given division point.

In the liquid crystal drive circuit described in Patent Document 1, the voltage generated at the division point of the second resistance division circuit can be supplied to a given division point of the first resistance division circuit via a buffer adapted to reduce the impedance of the voltage. It is possible to achieve two different gamma correction curves by turning on and off this supply of voltage.

SUMMARY

However, if it is possible to select a desired gamma correction curve from among a number of gamma correction curves in related-art the gray level voltage generation circuit shown in FIG. 15, as many resistance division circuits as the number of gamma correction curves available are necessary. At this time, it is necessary to provide as many resistors as the number obtained by multiplying the [number of resistors making up the resistance division circuit] by the [number of gamma correction curves]. That is, an extremely large circuit area is necessary to select a desired gamma correction curve from among a number of gamma correction curves available using the gray level voltage generation circuit in related art shown in FIG. 15.

When one gray level selection circuit is switched over to another in the related-art gray level voltage generation circuit shown in FIG. 15, some period of time is necessary to charge and discharge input capacitors of the gray level selection circuit and buffer. In order to achieve high speed operation, therefore, it is necessary to reduce the charge and discharge times by reducing the resistances of the resistors making up the resistance division circuits or to reduce the amount of time necessary for the voltage at each division point to reach a desired voltage level by inserting a buffer between the gray level selection circuits and resistors, thus resulting in larger power consumption.

It is necessary also for the technology disclosed in Patent Document 1 to provide the plurality of second resistance division circuits to make available a number of gamma correction curves as with the gray level voltage generation circuit in related art shown in FIG. 15, thus resulting in a large circuit area.

When one second resistance division circuit is switched over to another in the technology disclosed in Patent Document 1, several milliseconds are necessary from the switching to the stabilization of the voltage at the division point of the second resistance division circuit. This means that an extremely long delay takes place considering the fact that today's display devices operate at intervals of approximately one microsecond. That is, attempting to make available a variety of gamma correction curves using the technology described in Patent Document 1 leads to a tradeoff with high speed operation, thus making this countermeasure ineffective.

The present technology has been devised in light of the foregoing, and it is desirable to provide a display device, imaging device and gray level voltage generation circuit that permit high speed switching among a variety of gamma correction curves while at the same time keeping the increase in circuit area and power consumption to a minimum.

One mode of the present technology is a display device capable of displaying an image with two or more gray levels. The display device includes a voltage division circuit, gamma correction section, amplification circuit and adjustment section. The voltage division circuit generates a plurality of voltages using a resistance division circuit. The gamma correction section gamma-corrects the image using the voltages generated at division points of the resistance division circuit. The amplification circuit amplifies a given voltage and supplies the amplified voltage to at least one of the division points of the resistance division circuit. The adjustment section adjusts an amplification factor of the amplification circuit.

In the display device, the gamma correction section permits so-called gamma correction that is designed to correct the gray level of the image displayed on a display section using the voltage generated at each of the division points of the resistance division circuit. It should be noted that not only the voltages generated at the division points of the resistance division circuit but also end voltages of the same circuit may be used for the gamma correction of the gamma correction section.

An output voltage of the amplification circuit is supplied to one of the division points of the resistance division circuit. As a result, the voltage of the one division point is adjusted to the output voltage of the amplification circuit. At this time, the voltages of other division points of the resistance division circuit change with change in the voltage of the one division point. That is, when the voltage of one division point is adjusted, the voltages of other division points will change.

The adjustment section can adjust the amplification factor of the amplification circuit. That is, the adjustment section can exercise control in such a manner as to change the voltages generated at the division points of the resistance division circuit. As described above, the display device according to the mode of the present technology can vary a gamma correction curve for gamma correction performed by the gamma correction section quickly and in a variety of manners using a single voltage division circuit, amplification circuit and adjustment section, thus contributing to a small circuit area and low power consumption.

Another mode of the present technology is a display device capable of displaying an image with two or more gray levels on a display section. The display device includes a voltage division circuit, gamma correction section and voltage adjustment section. The voltage division circuit generates a plurality of voltages using a resistance division circuit. The gamma correction section gamma-corrects the image using the voltages generated at division points of the resistance division circuit. The voltage adjustment section increases or reduces the voltages generated at least two of the division points of the resistance division circuit for adjustment.

In the display device, the gamma correction section permits so-called gamma correction that is designed to correct the gray level of the image displayed on the display section using the voltage generated at each of the division points of the resistance division circuit. It should be noted that not only the voltages generated at the division points of the resistance division circuit but also end voltages of the same circuit may be used for the gamma correction of the gamma correction section.

The voltage adjustment section can adjust the voltages of at least two of the division points of the resistance division circuit. This allows the voltages of the two division points to be adjusted properly according to the adjustment performed by the voltage adjustment section. That is, the voltage adjustment section can adjust the voltages of two division points, thus varying and adjusting the voltages of other division points as a result of the adjustment thereof.

As described above, the display device according to the present mode of the present technology can vary a gamma correction curve for gamma correction performed by the gamma correction section quickly and in a variety of manners using a single voltage division circuit and voltage adjustment section. The display device adjusts the voltages of two division points of the resistance division circuit with the voltage adjustment section, thus contributing to improved degree of freedom in adjusting the shape of the gamma correction curve. Of course, the display device also contributes to a small circuit area and low power consumption.

Still another mode of the present technology is an imaging device capable of imaging a subject and generating a gray level image. The imaging device includes a voltage division circuit, gamma correction section, amplification circuit and adjustment section. The voltage division circuit generates a plurality of voltages using a resistance division circuit. The gamma correction section gamma-corrects the gray level image using the voltages generated at division points of the resistance division circuit. The amplification circuit amplifies a given voltage and supplies the amplified voltage to at least one of the division points of the resistance division circuit. The adjustment section adjusts an amplification factor of the amplification circuit.

In the imaging device, the gamma correction section permits so-called gamma correction that is designed to correct the gray level of an image displayed on a display section or recorded to a recording section using the voltage generated at each of the division points of the resistance division circuit. It should be noted that not only the voltages generated at the division points of the resistance division circuit but also end voltages of the same circuit may be used for the gamma correction of the gamma correction section.

An output voltage of the amplification circuit is supplied to one of the division points of the resistance division circuit. As a result, the voltage of the one division point is adjusted to the output voltage of the amplification circuit. At this time, the voltages of other division points of the resistance division circuit change with change in the voltage of the one division point. That is, when the voltage of one division point is adjusted, the voltages of other division points will change.

The adjustment section can adjust the amplification factor of the amplification circuit. That is, the adjustment section can exercise control in such a manner as to change the voltages generated at the division points of the resistance division circuit. As described above, the imaging device according to the present mode of the present technology can vary a gamma correction curve for gamma correction performed by the gamma correction section quickly and in a variety of manners using a single voltage division circuit, amplification circuit and adjustment section, thus contributing to a small circuit area and low power consumption.

A further mode of the present technology is a gray level voltage generation circuit that includes a voltage division circuit, gray level voltage generation section, amplification circuit and adjustment section. The voltage division circuit generates a plurality of voltages using a resistance division circuit. The gray level voltage generation section generates gray level voltages using the voltages generated at division points of the resistance division circuit. The amplification circuit amplifies a given voltage and supplies the amplified voltage to at least one of the division points of the resistance division circuit. The adjustment section adjusts an amplification factor of the amplification circuit.

In the gray level voltage generation circuit, the gray level voltage generation section generates gray level voltages using the voltages generated at the division points of the resistance division circuit. The gray level voltages can be used for so-called gamma correction that is designed to correct the gray level of an image on a variety of devices. It should be noted that not only the voltages generated at the division points of the resistance division circuit but also end voltages of the same circuit may be used for the gamma correction of the gamma correction section.

An output voltage of the amplification circuit is supplied to one of the division points of the resistance division circuit. As a result, the voltage of the one division point is adjusted to the output voltage of the amplification circuit. At this time, the voltages of other division points of the resistance division circuit change with change in the voltage of the one division point. That is, when the voltage of one division point is adjusted, the voltages of other division points will change.

The adjustment section can adjust the amplification factor of the amplification circuit. That is, the adjustment section can exercise control in such a manner as to change the voltages generated at the division points of the resistance division circuit. As described above, the gray level voltage generation circuit according to the present mode of the present technology can vary a gamma correction curve for gamma correction performed by the gamma correction section quickly and in a variety of manners using a single voltage division circuit, amplification circuit and adjustment section, thus contributing to a small circuit area and low power consumption.

It should be noted that the display device, imaging device and gray level voltage generation circuit described above include a variety of modes such as that in which they are implemented in a manner incorporated in another device or implemented together with another method. The present technology can also be implemented, for example, in the form of: a system including the display device, imaging device and gray level voltage generation circuit; a display method having steps for the configurations of the display device, imaging device and gray level voltage generation circuit; a program allowing a computer to achieve functions for the configurations of the display device, imaging device and gray level voltage generation circuit; and a computer-readable recording media having the program recorded thereon.

The present technology permits gamma correction with high speed switching among a variety of gamma correction curves while at the same time keeping the increase in circuit area and power consumption to a minimum.

DETAILED DESCRIPTION OF THE PREFERRED EMBODIMENTS

Figure 1:
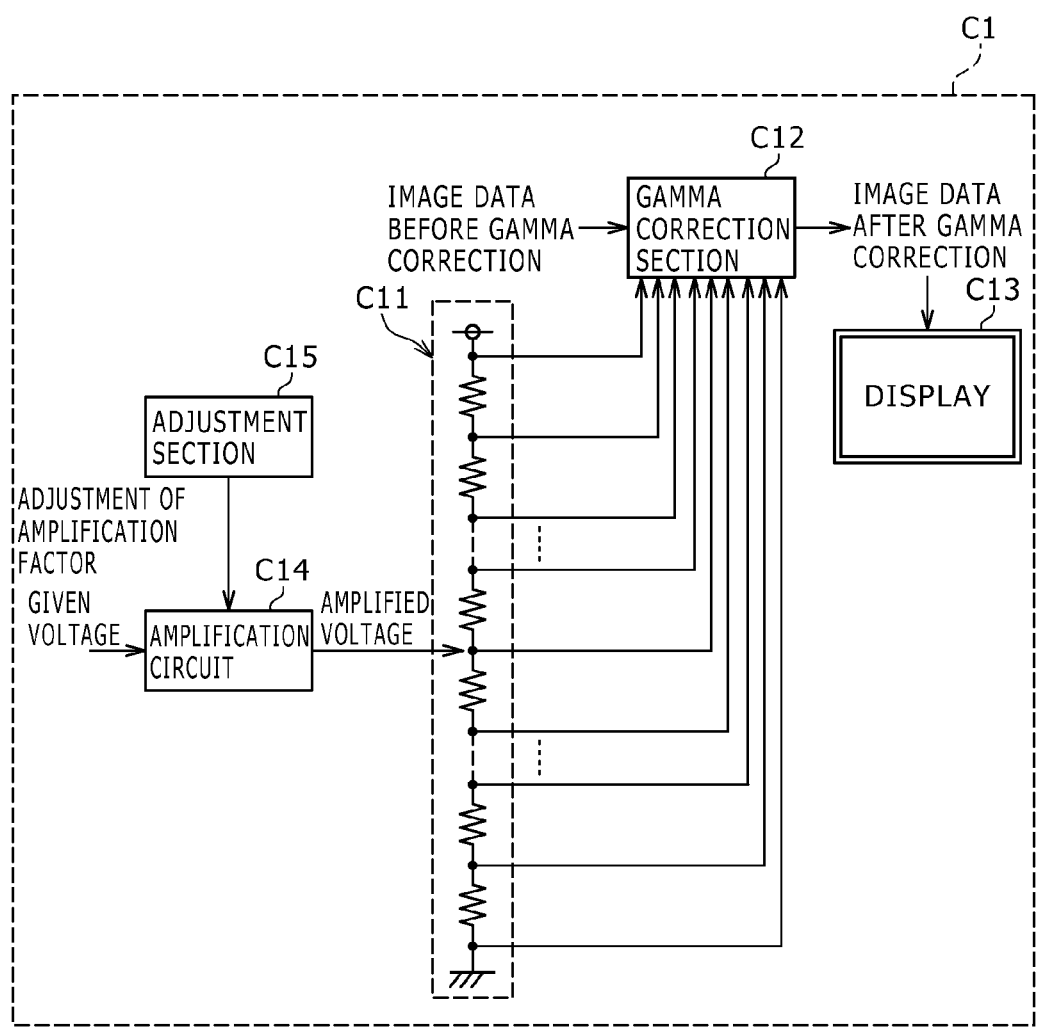
FIG. 1 is a diagram schematically illustrating a configuration of a display device according to a first embodiment.

A description will be given below of the present technology in the following order.
(A) First Embodiment
(B) Second Embodiment
(C) Third Embodiment
(D) Fourth Embodiment
(E) Fifth Embodiment
(F) Conclusion
(A) First Embodiment FIG. 1 is a diagram schematically illustrating a configuration of a display device C1 according to a first embodiment. In FIG. 1, the display device C1 includes a voltage division circuit C11, gamma correction section C12, display C13, amplification circuit C14 and adjustment section C15. It should be noted that the display device C1 may be an imaging device including the display device C1.

The voltage division circuit C11 generates a plurality of voltages using a resistance division circuit. The gamma correction section C12 gamma-corrects image data that has yet to be gamma-corrected using the voltages generated at division points of the resistance division circuit of the voltage division circuit C11, outputting the gamma-corrected image data. An image based on the gamma-corrected image data generated as described above is displayed on a screen of the display C13.

The amplification circuit C14 is supplied with a given voltage, amplifying the given voltage at a proper amplification factor and supplying the amplified voltage to at least one of the division points of the resistance division circuit of the voltage division circuit C11. This allows the voltage of the division point to be adjusted to the amplified voltage.

The adjustment section C15 adjusts the amplification factor of the amplification circuit C14. The same section C15 can adjust the amplification factor used by the amplification circuit C14 to amplify the given voltage. That is, when the adjustment section C15 adjusts the amplification factor of the amplification circuit C14, the amplified voltage is adjusted according to the amplification factor, thus allowing the voltages generated at the division points of the resistance division circuit of the voltage division circuit C11 to be adjusted. As a result, a gamma correction curve for the gamma correction performed by the gamma correction section C12 is also adjusted.

Figure 2:
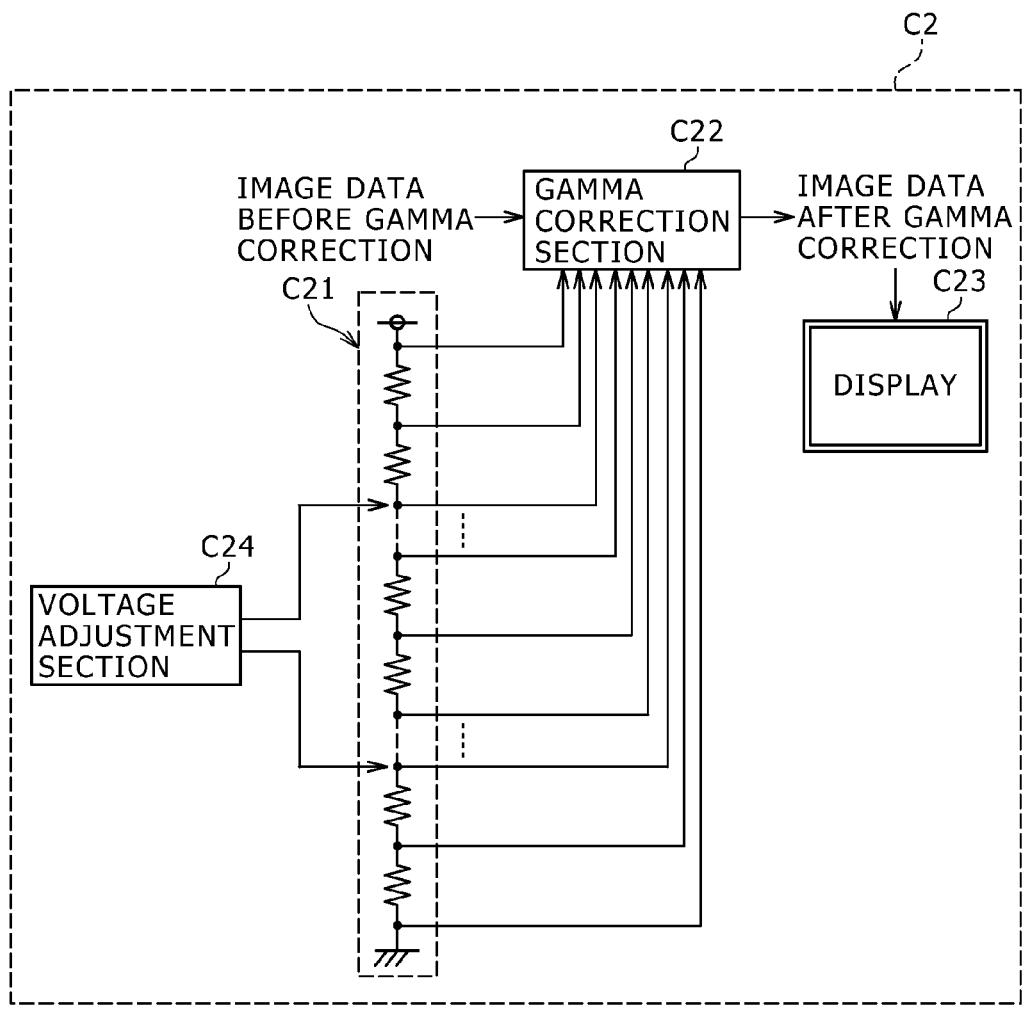
FIG. 2 is a diagram schematically illustrating a configuration of a display device according to a second embodiment.

As described above, the present first embodiment permits variation of the gamma correction curve for the gamma correction performed by the gamma correction section C12 quickly and in a variety of manners using the single voltage division circuit C11 having a resistance division circuit, the single amplification circuit C14 and the single adjustment section C15, contributing to a smaller circuit area and lower power consumption on generating a gray level voltage than in related art.
(B) Second Embodiment FIG. 2 is a diagram schematically illustrating a configuration of a display device C2 according to a second embodiment. In FIG. 2, the display device C2 includes a voltage division circuit C21, gamma correction section C22, display C23 and voltage adjustment section C24. It should be noted that the display device C2 may be an imaging device including the display device C2.

The voltage division circuit C21 generates a plurality of voltages using a resistance division circuit. The gamma correction section C22 gamma-corrects image data that has yet to be gamma-corrected using the voltages generated at division points of the resistance division circuit of the voltage division circuit C21, outputting the gamma-corrected image data. An image based on the gamma-corrected image data generated as described above is displayed on a screen of the display C23.

The voltage adjustment section C24 can adjust the voltages of at least two of the division points of the resistance division circuit of the voltage division circuit C21. This allows the voltages of the two division points, i.e., the voltages subject to the adjustment of the same section C24, to be adjusted in a variety of manners. When the voltage adjustment section C24 adjusts the voltages of the division points, the voltages generated at the division points of the resistance division circuit of the voltage division circuit C21 will also be adjusted, thus adjusting a gamma correction curve for the gamma correction performed by the gamma correction section C22.

As described above, the present second embodiment permits variation of the gamma correction curve for the gamma correction performed by the gamma correction section C22 quickly and in a variety of manners using the single voltage division circuit C21 having a resistance division circuit and the single voltage adjustment section C24, contributing to a small circuit area and low power consumption on generating a gray level voltage. The second embodiment adjusts the voltages of at least two of the division points, thus contributing to improved degree of freedom in adjusting the shape of the gamma correction curve.

(C) Third Embodiment

Figure 3:
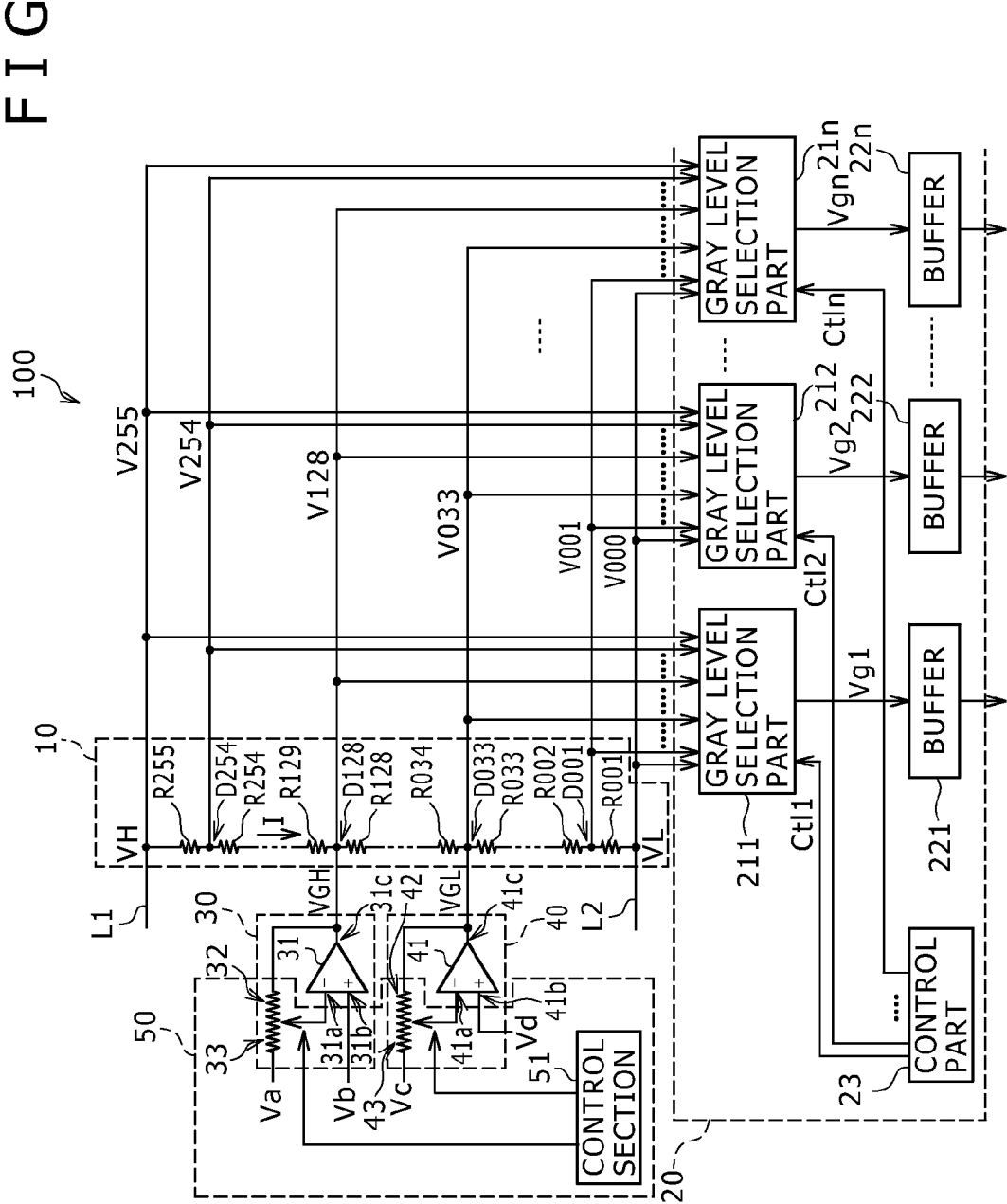
FIG. 3 is a diagram schematically illustrating a circuit configuration of a gray level voltage generation circuit according to a third embodiment.

FIG. 3 is a diagram schematically illustrating a circuit configuration of a gray level voltage generation circuit according to a third embodiment. In FIG. 3, a gray level voltage generation circuit 100 includes a resistance division circuit 10, gray level voltage output section 20, amplification circuits 30 and 40 and amplification factor adjustment section 50.

It should be noted that, in the third embodiment, the resistance division circuit 10 corresponds to the voltage division circuit C11 in the first embodiment and the voltage division circuit C21 in the second embodiment, that the amplification circuits 30 and 40 correspond to the amplification circuit C14 in the first embodiment, that the amplification factor adjustment section 50 corresponds to the adjustment section C15 in the first embodiment, and that the combination of the amplification circuits 30 and 40 and amplification factor adjustment section 50 corresponds to the voltage adjustment section C24 in the second embodiment.

The resistance division circuit 10 includes resistors R001 to R255 as a plurality of resistors connected in series, connecting a signal line L1 at a low impedance gray level reference voltage VH and a signal line L2 at a low impedance gray level reference voltage VL.

The resistance division circuit 10 generates a plurality of voltages V000 to V255, one for each of 256 gray levels as a plurality of gray levels. The voltages V000 to V255 include 254 voltages generated at division points D001 to D254 of the resistance division circuit 10 and the gray level reference voltages VH and VL.

It should be noted that the third embodiment will be described by taking, as an example, a case in which 256 gray levels are available as the plurality of gray levels. Naturally, however, the number of gray levels is not limited thereto.

More specifically, the resistance division circuit 10 includes 255 resistors that are connected in series in the third embodiment. However, the number of resistors included in the resistance division circuit 10 can be changed as appropriate according to the desired number of gray level voltages to be generated, i.e., the desired resolution of the gray level voltages.

The resistances of the resistors R001 to R255 making up the resistance division circuit 10 are adjusted as appropriate according to the desired shape of the gamma correction curve. For example, where a resistor having a greater resistance than other resistors is used, the change in voltage with change in gray level is greater than those of other resistors. Where a resistor having a smaller resistance than other resistors is used, the change in voltage with change in gray level is smaller than those of other resistors. As described above, selecting the resistance of each of the resistors as appropriate makes it possible to change the shape of the gamma correction curve in a variety of manners if the voltage is not adjusted using, for example, an amplification circuit which will be described later.

The gray level voltage output section 20 generates gray level voltages Vg1 to Vgn (where n is a positive integer equal to or less than 256), each associated with one of the plurality of gray levels, using the plurality of voltages V000 to V255 generated by the resistance division circuit 10. In FIG. 3, the gray level voltage output section 20 includes gray level selection parts 211 to 21n, buffers 221 to 22n and a control part 23.

Each of the gray level selection parts 211 to 21n is supplied with the plurality of voltages V000 to V255, each associated with one of the plurality of gray levels generated by the resistance division circuit 10. Each of the same parts 211 to 21n selects one of the plurality of voltages V000 to V255, outputting the selected voltage to the associated buffer. Which voltage is selected and output to the buffer is controlled by one of gray level selection signals Ctl1 to Ctln output from the control part 23. It should be noted that the control part 23 may be combined with a control part 51 which will be described later. Further, the same part 23 may be combined with a component primarily in charge of control such as a control section 370 if incorporated in a device such as a digital camera 300 according to a fifth embodiment which will be described later.

Each of the buffers 221 to 22n converts the gray level voltage supplied from the associated gray level selection part into a low impedance voltage, outputting the resultant voltage. In a display device or imaging device shown in the fifth embodiment which will be described later, the gray level voltages Vg1 to Vgn are supplied to a signal processing section 330 handling gamma correction and a drive circuit of a display section 340. The gray level voltages Vg1 to Vgn are used to perform gamma correction, record a gamma-corrected image to a recording media and display the image on a display.

The plurality of voltages V000 to V255 output from the resistance division circuit 10 can be changed in a variety of manners by the amplification circuits 30 and 40 that output a variety of voltages under control of the amplification factor adjustment section 50. That is, in the present third embodiment, the gamma correction curve for the gamma correction performed by the signal processing section according to the plurality of voltages V000 to V255 output from the resistance division circuit 10 is adjusted under control of the amplification factor adjustment section 50. A detailed description will be given below of the amplification circuits 30 and 40 and amplification factor adjustment section 50.

The amplification circuit 30 uses an operational amplifier 31 to amplify a given potential difference relative to a given voltage at an appropriate amplification factor and output the resultant voltage. Similarly, the amplification circuit 40 uses an operational amplifier 41 to amplify a given potential difference relative to a given voltage at an appropriate amplification factor and output the resultant voltage.

More specifically, the amplification circuit 30 includes the operational amplifier 31, and first and second resistors 32 and 33. The first resistor 32 connects an inverted input terminal 31a and output terminal 31c of the operational amplifier 31, thus applying negative feedback to the operational amplifier 31. The second resistor 33 is connected to the inverted input terminal 31a.

The inverted input terminal 31a of the operational amplifier 31 is supplied with a given voltage Va via the second resistor 33. A non-inverted input terminal 31b is supplied with a given voltage Vb. The output terminal 31c is connected to a division point D128 provided between resistors R128 and R129 that make up the resistance division circuit 10.

Letting the resistance of the first resistor 32 be denoted by R32, and that of the second resistor 33 by R33, an amplification factor A1 of the amplification circuit 30 configured as described above can be expressed by the ratio between these resistances (R32/R33).

Therefore, the amplification circuit 30 outputs a voltage "$-A1 \times \Delta V1$" obtained by inverting and amplifying a potential difference $\Delta V1$ (=Va−Vb), relative to the given voltage Vb supplied to the non-inverted input terminal 31b, at the amplification factor A1. The potential difference $\Delta V1$(=Va−Vb) is the difference between the given voltage Va supplied to the inverted input terminal 31a via the second resistor 33 and the given voltage Vb supplied to the non-inverted input terminal 31b. That is, an output voltage VGH of the amplification circuit 30 is equal to (Vb−A1×ΔV1).

As a result, the division point D128 of the resistance division circuit 10 is adjusted to the output voltage VGH proportional to the amplification factor A1 of the amplification circuit 30.

The amplification circuit 40 includes the operational amplifier 41, and first and second resistors 42 and 43. The first resistor 42 connects an inverted input terminal 41a and output terminal 41c of the operational amplifier 41, thus applying negative feedback to the operational amplifier 41. The second resistor 43 is connected to the inverted input terminal 41a.

The inverted input terminal 41a of the operational amplifier 41 is supplied with a given voltage Vc via the second resistor 43. A non-inverted input terminal 41b is supplied with a given voltage Vd. The output terminal 41c is connected to a division point D033 provided between resistors R033 and R034 that make up the resistance division circuit 10.

Letting the resistance of the first resistor 42 be denoted by R42, and that of the second resistor 43 by R43, an amplification factor A2 of the amplification circuit 40 configured as described above can be expressed by the ratio between these resistances (R42/R43).

The amplification circuit 40 outputs a voltage "$-A2 \times \Delta V2$" obtained by inverting and amplifying a potential difference $\Delta V2$(=Vc−Vd), relative to the given voltage Vd supplied to the non-inverted input terminal 41b, at the amplification factor A2. The potential difference $\Delta V2$(=Vc−Vd) is the difference between the given voltage Vc supplied to the inverted input terminal 41a via the second resistor 43 and the given voltage Vd supplied to the non-inverted input terminal 41b. That is, an output voltage VGL of the amplification circuit 40 is equal to (Vd−A2×ΔV2).

As a result, the division point D033 of the resistance division circuit 10 is adjusted to the output voltage VGL proportional to the amplification factor A2 of the amplification circuit 40.

Adjusting the gray level voltages of the division points D128 and D033 provided at halfway positions in the resistance division circuit 10 with the amplification circuits 30 and 40 configured as described above incorporating operational amplifiers provides a shorter period of time before the division points of the resistance division circuit 10 are stabilized to desired voltage levels than adjusting the amplification circuits 30 and 40 to the division points provided at halfway positions in the resistance division circuit 10 without using operational amplifiers or other components capable of producing a low impedance output.

The reason for this is that the output terminals of the operational amplifiers 31 and 41 have a low impedance. That is, supplying VGH and VGL, i.e., the low impedance voltages, to halfway positions between VH and VL, i.e., the low impedance gray level reference voltages VH and VL, provides a reduced number of resistors between these low impedance voltages. This provides improved capability of the resistance division circuit 10 to drive the resistors, thus contributing to a shorter period of time before the division points of the resistance division circuit 10 are stabilized to desired voltage levels.

This provides sufficiently fast response even when larger resistances are used for the resistors making up the resistance division circuit 10 when compared to the related art. Then, increasing the resistances of the resistors making up the resistance division circuit 10 reduces a penetration current I flowing through the resistance division circuit 10, thus contributing to reduced power consumption of the same circuit 10.

The amplification factors A1 and A2 of the amplification circuits 30 and 40 configured as described above are adjusted as appropriate under control of the amplification factor adjustment section 50 which will be described below.

More specifically, the same section 50 has two functionalities, one adapted to control the ratio between the resistances of the first and second resistors 32 and 33 of the amplification circuit 30 by adjusting the resistances thereof, and another adapted to control the ratio between the resistances of the first and second resistors 42 and 43 of the amplification circuit 40 by adjusting the resistances thereof. This allows the amplification factor adjustment section 50 to adjust the amplification factors A1 and A2 of the amplification circuits 30 and 40, respectively.

Figure 4:
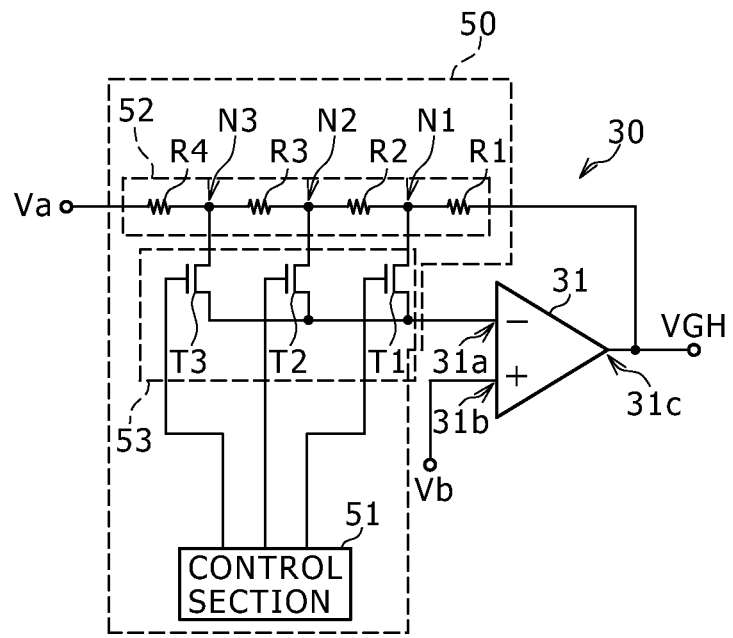
FIG. 4 is a diagram illustrating a specific configuration example of an adjustment section.

FIG. 4 is a diagram illustrating a specific configuration example of the amplification factor adjustment section 50 shown in FIG. 3. It should be noted that although FIG. 4 illustrates a case in which the amplification factor adjustment section 50 adjusts the amplification factor of the amplification circuit 30, we assume that the same section 50 similarly adjusts the amplification factor of the amplification circuit 40.

In FIG. 4, the amplification factor adjustment section 50 includes a resistor group 52, resistor selection circuit 53 and the control part 51. The resistor group 52 includes a plurality of resistors R1 to R4 that are connected in series. The control part 51 controls the resistor selection circuit 53. In the present embodiment, the resistor selection circuit 53 is implemented using FETs (Field Effect Transistors) T1 to T3 as switching elements. It should be noted that a connection point between the resistors R1 and R2 will be referred to as a node N1, that between the resistors R2 and R3 as a node N2, and that between the resistors R3 and R4 as a node N3 in the description given below.

The FET T1 connects the node N1 of the resistor group 52 and the inverted input terminal 31a with its source and drain terminals. The FET T2 connects the node N2 of the resistor group 52 and the inverted input terminal 31a with its source and drain terminals. The FET T3 connects the node N3 of the resistor group 52 and the inverted input terminal 31a with its source and drain terminals. The gates of the FETs T1 to T3 are connected to the control part 51.

One end (terminal of the resistor R1 in FIG. 4) of the resistor group 52 is connected to the output terminal 31c. The other end (terminal of the resistor R4 in FIG. 4) thereof is supplied with the given voltage Va. The nodes N1, N2 and N3 of the resistors R1 to R4 making up the resistor group 52 are connected to the inverted input terminal 31a of the operational amplifier 31 via the resistor selection circuit 53.

The control part 51 supplies the gates of the FETs T1 to T3 with signals adapted to control the turning on and off of the FETs T1 to T3 as control signals adapted to specify the amplification factor of the amplification circuit 30. This allows part of the resistor group 52 to serve as the first resistor 32 adapted to apply negative feedback to the operational amplifier 31 and another part of the resistor group 52 to serve as the second resistor 33 connected to the inverted input terminal 31a of the operational amplifier 31.

A specific description will be given below of which resistors of the resistor group 52 make up the first resistor 32 and which other resistors thereof make up the second resistor 33.

Figure 9:
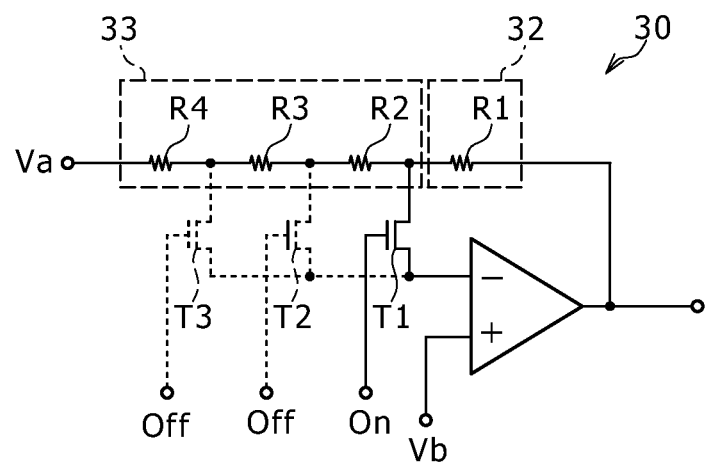
FIG. 9 is a diagram describing the adjustment of the first and second resistors performed by the adjustment section.
Figure 10:
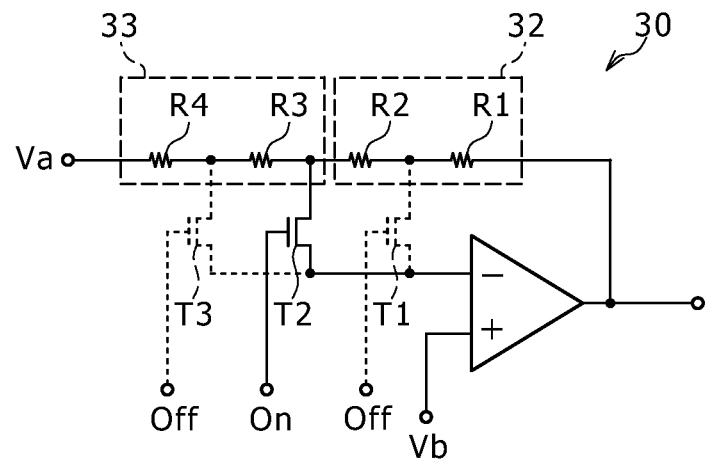
FIG. 10 is a diagram describing the adjustment of the first and second resistors performed by the adjustment section.
Figure 11:
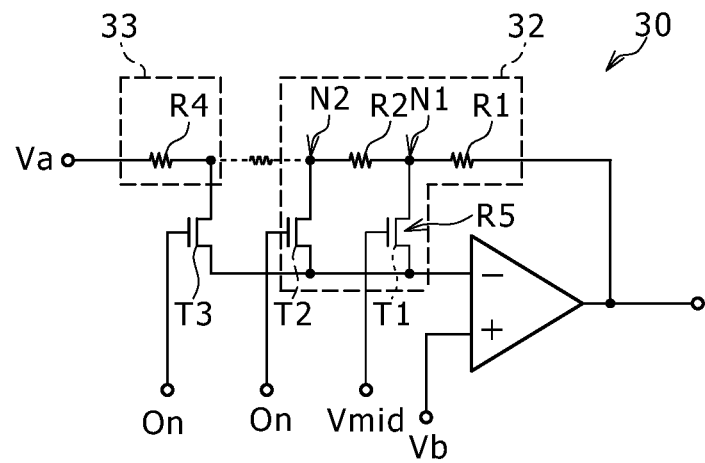
FIG. 11 is a diagram describing the adjustment of the first and second resistors performed by the adjustment section.

FIGS. 5 to 11 are diagrams describing the adjustment of the first and second resistors 32 and 33 performed by the amplification factor adjustment section 50. It should be noted that, in order to make it easier to understand the state of each component in these figures, the components substantially unfunctional are shown by dotted lines, and that a FET controlled to be in a state intermediate between on and off is shown by a thinner line than those by which other FETs are shown in FIG. 11.

Figure 5:
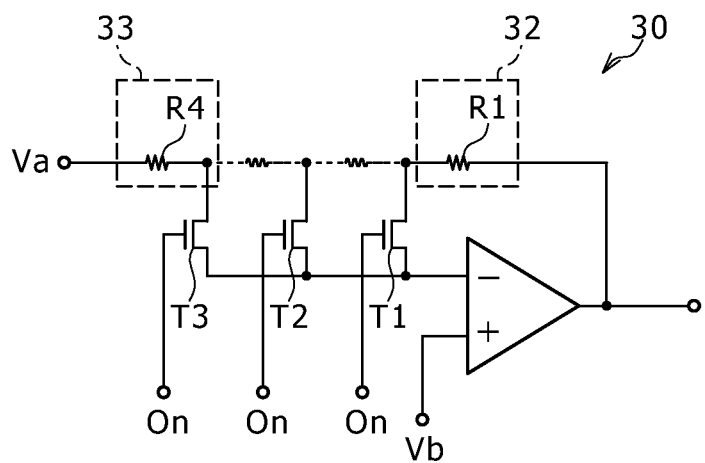
FIG. 5 is a diagram describing the adjustment of first and second resistors performed by the adjustment section.

In FIG. 5, the control part 51 controls all the FETs T1 to T3 to be on. In this case, the resistor R1 makes up the first resistor 32, and the resistor R4 the second resistor 33. Therefore, the amplification factor A1 of the amplification circuit 30 is equal to R1/R4.

Figure 6:
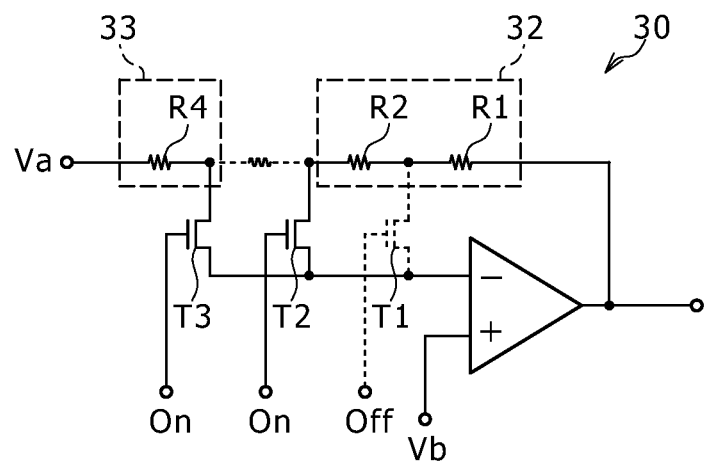
FIG. 6 is a diagram describing the adjustment of the first and second resistors performed by the adjustment section.

In FIG. 6, the control part 51 controls the FET T1 to be off and the FETs T2 and T3 to be on. In this case, the resistors R1 and R2 make up the first resistor 32, and the resistor R4 makes up the second resistor 33. Therefore, the amplification factor A1 of the amplification circuit 30 is equal to (R1+R2)/R4.

Figure 7:
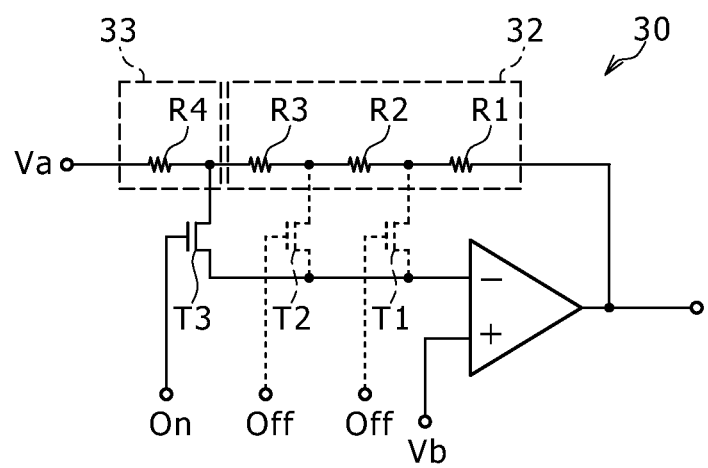
FIG. 7 is a diagram describing the adjustment of the first and second resistors performed by the adjustment section.

In FIG. 7, the control part 51 controls the FETs T1 and T2 to be off and the FET T3 to be on. In this case, the resistors R1, R2 and R3 make up the first resistor 32, and the resistor R4 makes up the second resistor 33. Therefore, the amplification factor A1 of the amplification circuit 30 is equal to (R1+R2+R3)/R4.

Figure 8:
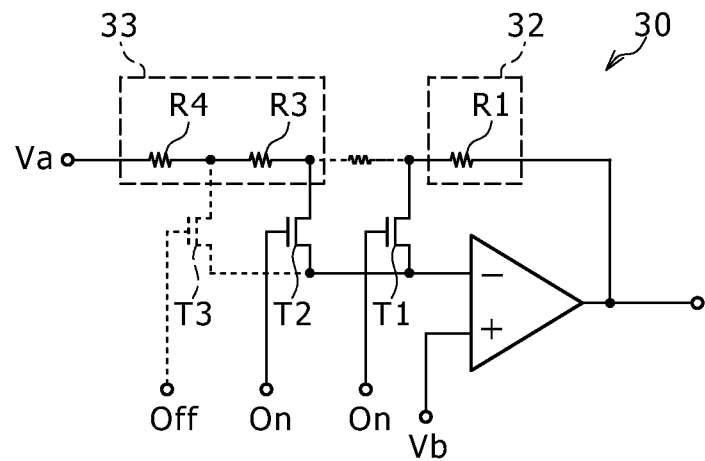
FIG. 8 is a diagram describing the adjustment of the first and second resistors performed by the adjustment section.

In FIG. 8, the control part 51 controls the FETs T1 and T2 to be on and the FET T3 to be off. In this case, the resistor R1 makes up the first resistor 32, and the resistors R3 and R4 make up the second resistor 33. Therefore, the amplification factor A1 of the amplification circuit 30 is equal to R1/(R3+R4).

In FIG. 9, the control part 51 controls the FET T1 to be on and the FETs T2 and T3 to be off. In this case, the resistor R1 makes up the first resistor 32, and the resistors R2, R3 and R4 make up the second resistor 33. Therefore, the amplification factor A1 of the amplification circuit 30 is equal to R1/(R2+R3+R4).

In FIG. 10, the control part 51 controls the FETs T1 and T3 to be off and the FET T2 to be on. In this case, the resistors R1 and R2 make up the first resistor 32, and the resistors R3 and R4 make up the second resistor 33. Therefore, the amplification factor A1 of the amplification circuit 30 is equal to (R1+R2)/(R3+R4).

In addition to the above, it is possible to achieve an on state which is intermediate among the states shown in FIGS. 6 to 10 by controlling the voltage applied to the gates of the FETs T1 to T3 to an intermediate voltage level between the on and off states. An example thereof is shown in FIG. 11.

In FIG. 11, the control part 51 controls the FETs T2 and T3 to be on and the FET T1 to be at a voltage Vmid which is intermediate between the on and off states. At this time, a current flows between the source and drain of the FET T1, thus generating a voltage at the node N1 and making the voltages at the nodes N1 and N2 different. Therefore, the resistor R2 and FET T1 are connected in parallel. In this case, the resistors R1 and R2 and a resistor R5 of the FET T1 make up the first resistor 32, and the resistor R4 makes up the second resistor 33. As a result, the amplification factor A1 of the amplification circuit 30 is equal to ((R2×R5)/(R2+R5))+R1.

As described above, changing the amplification factors of the amplification circuits 30 and 40 in a variety of manners using the amplification factor adjustment section 50 shown in FIG. 4 allows to change the outputs of the amplification circuits 30 and 40 in a variety of manners, thus changing the voltages generated at the division points of the resistance division circuit 10 in a variety of manners. That is, it is clear that various combinations of gray level voltages that permit gamma correction in a variety of manners can be output from the amplification circuits 30 and 40.

Figure 12:
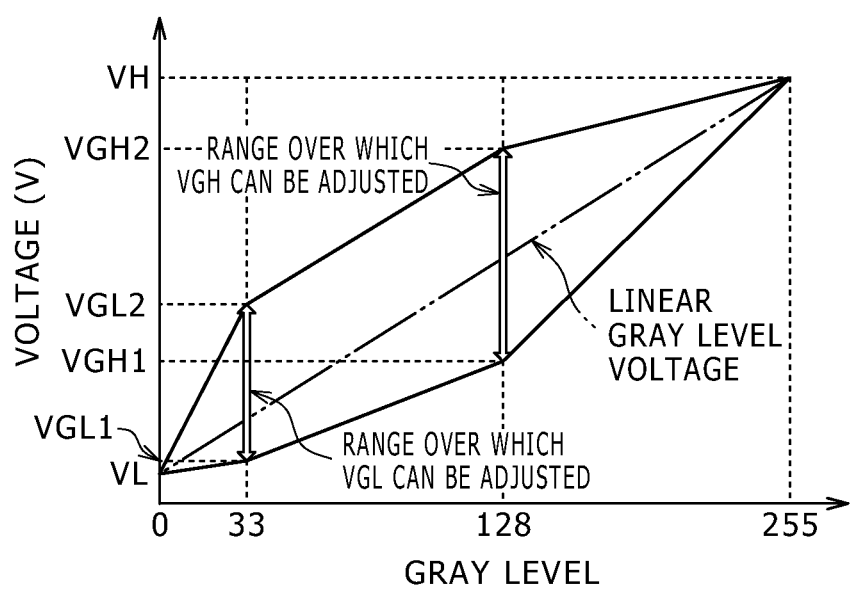
FIG. 12 is a diagram describing voltages generated at division points of a resistance division circuit.

FIG. 12 is a diagram describing a gamma correction curve formed with the voltages generated at the division points D001 to D254 of the resistance division circuit 10 and the gray level reference voltages VH and VL. FIG. 12 illustrates, in accordance with FIG. 3, a case in which the voltages at the division points D033 and D128 of the resistance division circuit 10 are adjusted by adjusting the amplification factors of the amplification circuits 30 and 40 using the amplification factor adjustment section 50. It should be noted that, in the description given below, a hypothetical gray level voltage that increases linearly with increase in gray level will be referred to as a linear gray level voltage for convenience of description.

In the example shown in FIG. 12, the output voltage VGH of the amplification circuit 30 can be adjusted from a lower limit voltage VGH1 to an upper limit voltage VGH2. Similarly, the output voltage VGL of the amplification circuit 40 can be adjusted from a lower limit voltage VGL1 to an upper limit voltage VGL2.

If the output voltage VGH of the amplification circuit 30 is set lower than the linear gray level voltage while at the same time setting the output voltage VGL of the amplification circuit 40 lower than the linear gray level voltage, a downward convex gamma correction curve can be achieved for the gray level voltage output from the resistance division circuit 10.

If the output voltage VGH of the amplification circuit 30 is set higher than the linear gray level voltage while at the same time setting the output voltage VGL of the amplification circuit 40 higher than the linear gray level voltage, an upward convex gamma correction curve can be achieved for the gray level voltage output from the resistance division circuit 10.

If the output voltage VGH of the amplification circuit 30 is set higher than the linear gray level voltage while at the same time setting the output voltage VGL of the amplification circuit 40 lower than the linear gray level voltage, or if the output voltage VGH of the amplification circuit 30 is set lower than the linear gray level voltage while at the same time setting the output voltage VGL of the amplification circuit 40 higher than the linear gray level voltage, an S-shaped gamma correction curve can be achieved for the gray level voltage output from the resistance division circuit 10.

As described above, a variety of gamma correction curves can be achieved by adjusting the on and off states of the FETs T1 to T3 as appropriate using the amplification factor adjustment section 50 shown in FIG. 4 and achieving a variety of amplification factors of the amplification circuits 30 and 40.

Switching among the various gamma correction curves as described above is accomplished by the control part 51 controlling the amplification factor adjustment section 50. The control part 51 supplies a given control signal to the amplification factor adjustment section 50 when a given condition for changing the gamma correction curves is satisfied. The same section 50 adjusts the amplification factor A1 of the amplification circuit 30 in response to the control signal supplied from the control part 51. The given condition for changing the gamma correction curves can be, for example, an operation input made by an operator of a device including the gray level voltage generation circuit 100 to an operation input section (not shown) to change the gamma correction curves.

The ranges over which the output voltages of the amplification circuits 30 and 40 vary can be set by determining, as appropriate and in accordance with a desired gamma correction curve, given voltages Va and Vc, i.e., reference voltages for amplification by the same circuits 30 and 40, given potential differences ΔV1 and ΔV2 to be amplified by the amplification circuits 30 and 40, and the amplification factors A1 and A2 of the same circuits 30 and 40.

That is, if the gray level voltage at the division point D033 is varied between V1 and V2 for adjustment, the amplification factor A1 of the amplification circuit 30, the given voltage Va and given potential difference ΔV1 are determined in such a manner that Equations (1) shown below are satisfied. It should be noted that the amplification factor A1 varies between x1 and x2 in Equations (1) shown below.

$$V_1 = V_a + \Delta V_1 \times x_1, \ V_2 = V_a + \Delta V_1 \times x_2 \quad (1)$$

Similarly, if the gray level voltage at the division point D128 is varied between V3 and V4 for adjustment, the amplification factor A2 of the amplification circuit 40, the given voltage Vc and given potential difference ΔV2 are determined in such a manner that Equations (2) shown below are satisfied. It should be noted that the amplification factor A2 varies between x3 and x4 in Equations (2) shown below.

$$V_3 = V_c + \Delta V_2 \times x_3, \ V_4 = V_c + \Delta V_2 \times x_4 \quad (2)$$

It should be noted that although, in the present embodiment, the gray level voltage generation circuit 100 includes the two amplification circuits 30 and 40, a plurality of amplification circuits can be provided so long as the number of such circuits is equal to or less than the number of division points of the resistance division circuit. That is, there may be only one amplification circuit or three or more amplification circuits.

The more amplification circuits there are, the smoother the gamma correction curve formed by the gray level voltage, and the better the gray level reproducibility of a gamma-corrected image. It should be noted, however, that increasing the number of amplification circuits leads to disadvantages such as more circuit elements and a larger circuit area. Practically, therefore, an optimal number of amplification circuits are provided by balancing advantages against disadvantages.

(D) Fourth Embodiment

Figure 13:
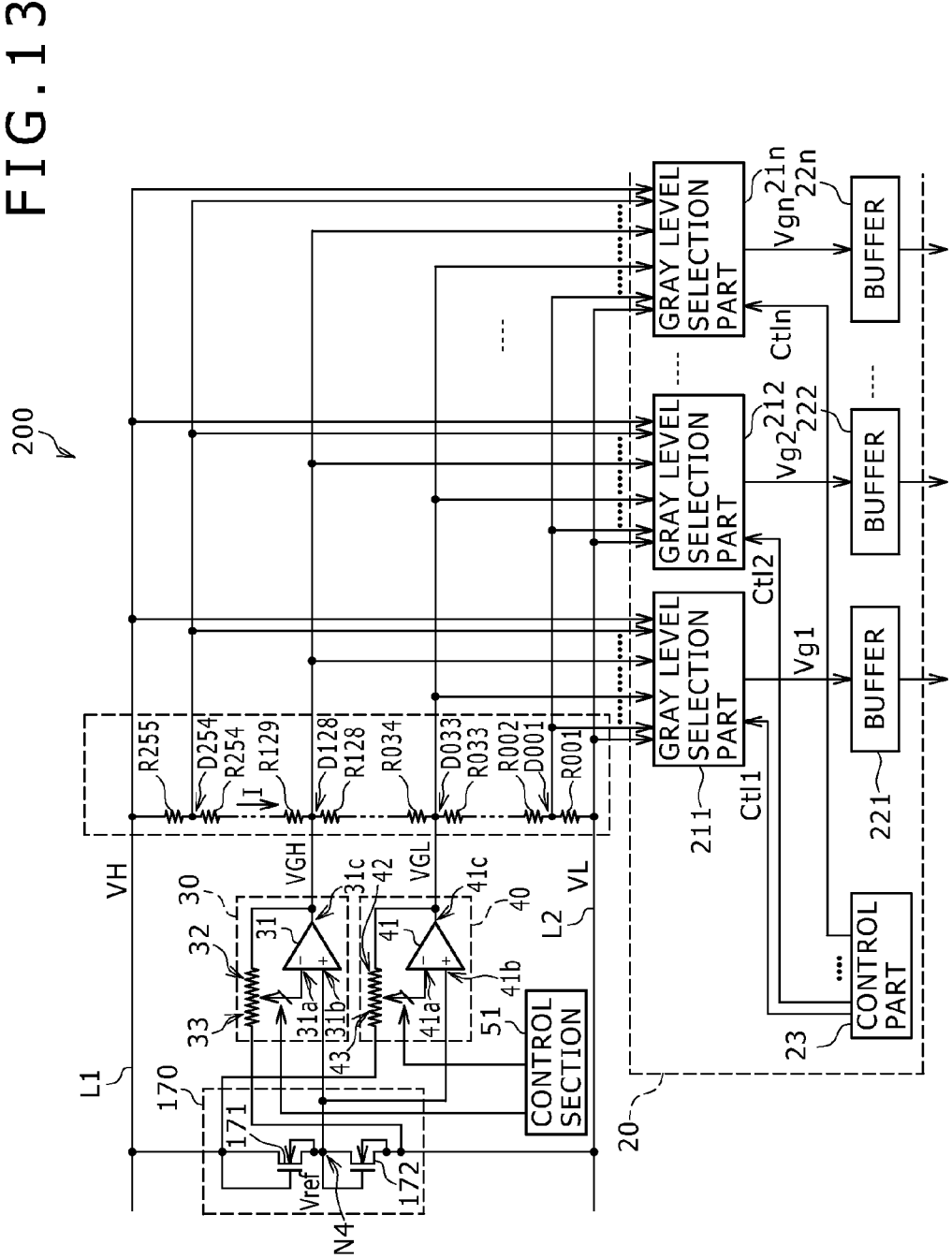
FIG. 13 is a diagram schematically illustrating a circuit configuration of a gray level voltage generation circuit according to a fourth embodiment.

A description will be given next of a fourth embodiment with reference to FIG. 13. A gray level voltage generation circuit 200 shown in FIG. 13 is identical to the counterpart according to the third embodiment shown in FIG. 3 except that a voltage (voltage Vref which will be described later) generated by a transistor voltage division circuit 170 and the gray level reference voltages VH and VL rather than the given voltages Va, Vb, Vc and Vd are supplied to the inverted and non-inverted input terminals of the operational amplifiers 31 and 41. In the description given below, therefore, the same components as those of the gray level voltage generation circuit 100 shown in FIG. 3 are denoted by the same reference symbols, and the description thereof will be omitted.

In FIG. 13, the gray level voltage generation circuit 200 includes the transistor voltage division circuit 170 as a component adapted to generate a voltage to be supplied to the non-inverted input terminals 31b and 41b of the operational amplifiers 31 and 41. The same circuit 170 includes an N-channel MOSFET (Metal-Oxide-Semiconductor Field-Effect Transistor) 171 (hereinafter written as the nFET 171) and an N-channel MOSFET 172 (hereinafter written as the nFET 172).

The nFETs 171 and 172 are connected in series as a result of the connection of the source terminal of the nFET 171 with the drain terminal of the nFET 172. It should be noted that, in the description given below, a voltage generated at a connection point N4 between the nFETs 171 and 172 will be referred to as the voltage Vref. Although FIG. 13 illustrates a case in which the transistor voltage division circuit 170 is formed by connecting the two N-channel MOSFETs in series, the same circuit 170 can be naturally formed by connecting two P-channel MOSFETs in series. As described above, the transistor voltage division circuit 170 can be formed by using a CMOS (Complementary Metal Oxide Semiconductor) manufacturing process if the voltage Vref is generated by using MOS transistors.

The transistor voltage division circuit 170 connects the signal line L1 of the gray level reference voltage VH and the signal line L2 of the gray level reference voltage VL together. As a result, the drain of the nFET 171 is supplied with the gray level reference voltage VH, and the source of the nFET 172 is supplied with the gray level reference voltage VL. The gate of the nFET 171 is connected to the signal line L1 of the gray level reference voltage VH, and the gate of the nFET 172 is connected to its drain. That is, the nFETs 171 and 172 are diode-connected FETs having their gates and drains connected.

The nFET 171 serves as a resistor having a resistance proportional to the potential difference between the gray level reference voltage VH and voltage Vref. That is, a current proportional to the potential difference between the gray level reference voltage VH and voltage Vref flows through the nFET 171.

Similarly, the nFET 172 serves as a resistor having a resistance proportional to the potential difference between the voltage Vref and gray level reference voltage VL. That is, a current proportional to the potential difference between the voltage Vref and gray level reference voltage VL flows through the nFET 172.

The voltage Vref generated at the connection point N4 is the voltage ((VH−VL)×(ΔV2/(ΔV1+ΔV2))) obtained by dividing the potential difference (VH−VL) between the gray level reference voltages VH and VL according to the ratio (ΔV1:ΔV2) between the potential difference ΔV1 generated between the source and drain of the nFET 171 and the potential difference ΔV2 generated between the source and drain of the nFET 172.

The voltage Vref is proportional to the size ratio or aspect ratio between the nFETs 171 and 172. That is, if the size ratio or aspect ratio between the nFETs 171 and 172 is the same, it is possible to set the voltage Vref generated at the connection point N4 to an intermediate voltage Vm between the gray level reference voltages VH and VL. It should be noted that the size of an FET refers to a channel width W and channel length L, and the aspect ratio of an FET refers to the ratio between the channel width W and channel length L or W/L.

The connection point N4 of the transistor voltage division circuit 170 configured as described above is connected to the non-inverted input terminal 31*b* of the operational amplifier 31 of the amplification circuit 30 and the non-inverted input terminal 41*b* of the operational amplifier 41 of the amplification circuit 40. These non-inverted input terminals 31*b* and 41*b* are supplied with the voltage Vref generated using voltage/current and current/voltage conversion functionalities of the transistor voltage division circuit 170.

If the intermediate voltage Vm is supplied as the voltage Vref, the amplification circuit 30 adjusts the division point D128 that is higher in voltage than the intermediate voltage Vm, and the amplification circuit 40 adjusts a division point that is lower in voltage than the intermediate voltage Vm. At this time, the inverted input terminal 31*a* of the operational amplifier 31 making up the amplification circuit 30 is supplied with the gray level reference voltage VL via the first resistor 32, and the inverted input terminal 41*a* of the operational amplifier 41 making up the amplification circuit 40 is supplied with the gray level reference voltage VH via the first resistor 42.

As a result, the output voltage VGH of the amplification circuit 30 and the output voltage VGL of the amplification circuit 40 are adjusted to the values shown below in Equations 3 and 4.

$$VHG = \left(\frac{1}{2} + \frac{R_4}{2R_3}\right)V_H + \left(\frac{1}{2} - \frac{R_4}{2R_3}\right)V_L \quad (3)$$

$$VHG = \left(\frac{1}{2} + \frac{R_4}{2R_3}\right)V_H + \left(\frac{1}{2} - \frac{R_4}{2R_3}\right)V_L \quad (4)$$

That is, the range over which the output voltage of the amplification circuit 30 can be adjusted is from the intermediate voltage Vm to the gray level reference voltage VH, and the range over which the output voltage of the amplification circuit 40 can be adjusted is from the gray level reference voltage VL to the intermediate voltage Vm. This provides an appropriate and yet smooth gamma correction curve formed using the gray level voltage adjusted with the amplification circuits 30 and 40.

(E) Fifth Embodiment

Figure 14:
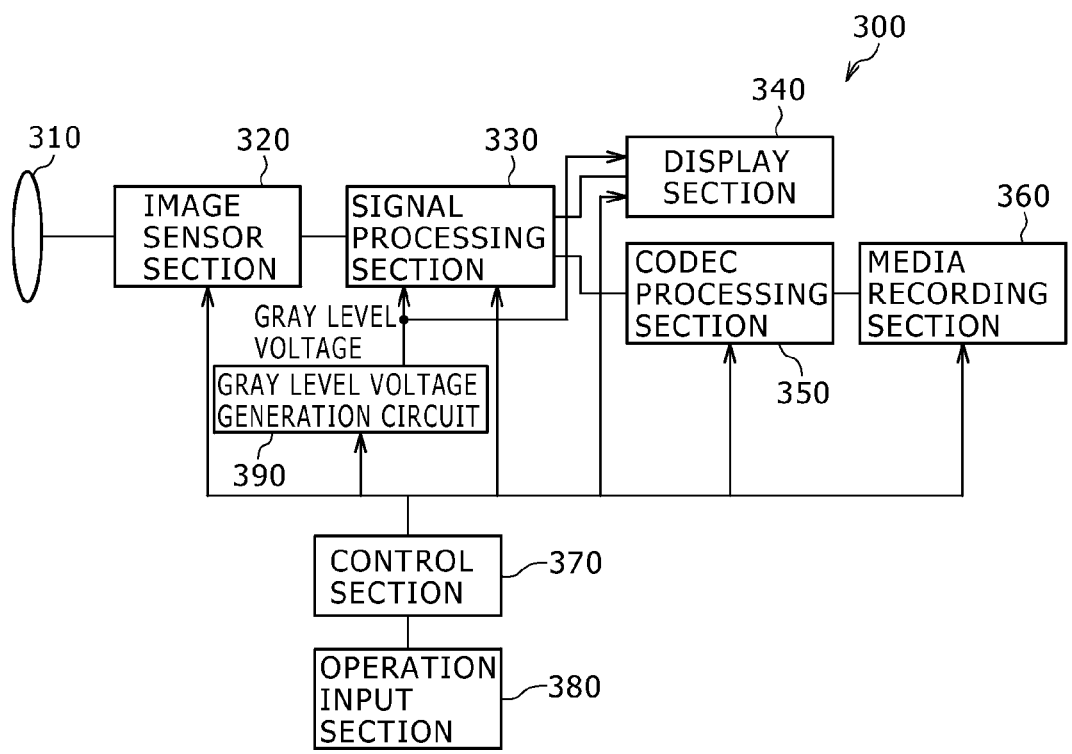
FIG. 14 is a block diagram illustrating a configuration of a digital camera according to a fifth embodiment.
Figure 15:
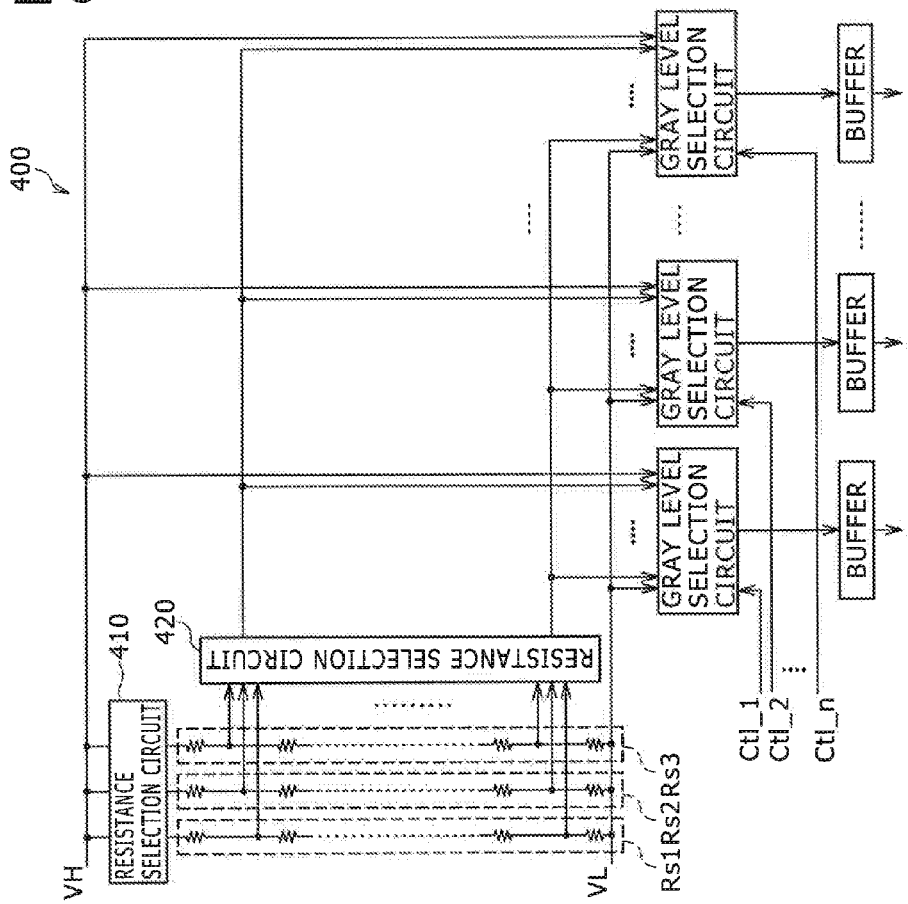
FIG. 15 is a diagram illustrating an example of a gray level voltage generation circuit in related art.
Figure 16:
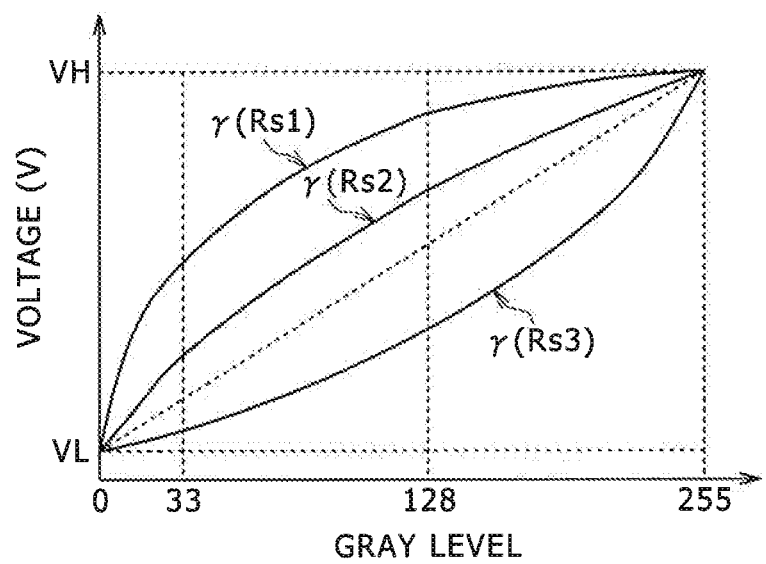
FIG. 16 is a diagram illustrating examples of gamma correction curves achieved by the gray level voltage generation circuit in related art.

A description will be given next of a specific example of equipment having the gray level voltage generation circuit according to the third or fourth embodiment described above. FIG. 14 is a block diagram illustrating a configuration of the digital camera 300 (imaging device or display device) having the gray level voltage generation circuit shown in FIG. 3 or 13. It should be noted that the digital camera 300 may be a digital still camera adapted to capture a still image or a digital video camcorder adapted to capture a moving image.

The digital camera 300 shown in FIG. 14 includes a lens 310 including a zoom optics, an imaging sensor section 320, the signal processing section 330, the display section 340, a codec processing section 350, a media recording section 360, the control section 370 and an operation input section 380.

The image sensor section 320 supplies an imaging signal (signal for image data) to the signal processing section 330.

The signal processing section 330 subjects the supplied imaging signal to white balancing, gamma correction, color separation and other given signal processing, supplying the resultant signal to the display section 340 and codec processing section 350. It should be noted that the signal processing section 330 can handle signal processing independently for the display section 340 and codec processing section 350.

The digital camera 300 includes a gray level voltage generation circuit 390 equivalent to the gray level voltage generation circuit 100 according to the third embodiment or the gray level voltage generation circuit 200 according to the fourth embodiment described above, thus allowing a drive circuit of the signal processing section 330 or display section 340 to perform gamma correction according to the gray level voltage supplied from the gray level voltage generation circuit 390.

The display section 340 includes, for example, a liquid crystal or organic EL display to display an image based on the image signal supplied from the signal processing section 330. Each of these displays includes a drive circuit adapted to drive a liquid crystal or EL display panel based on image data supplied to the display section 340. The display section 340 can use this drive circuit to perform gamma correction. In this case, the gray level voltage described above is supplied to the drive circuit.

The codec processing section 350 compresses the imaging signal supplied from the signal processing section 330 according to a given compressing scheme, supplying the compressed signal to the media recording section 360. The same section 360 stores, under control of the control section 370, the imaging signal supplied from the signal processing section 330 on a recording media such as a semiconductor memory, magnetic disk, magneto-optical disk or optical disk. This recording media may be attachable to and detachable from the digital camera 300.

The control section 370 controls the image sensor section 320, signal processing section 330, display section 340, codec processing section 350, media recording section 360 and gray level voltage generation circuit 390 based on an operation input made through the operation input section 380 by a user.

The user of the digital camera 300 can make an operation input to the control section 370 via the operation input section 380. The same section 380 can include, in addition to a shutter button adapted to instruct that imaging be performed, for example, a jog dial, keys, a lever, a button or a touch panel. Upon acceptance of an operation made by the user, the operation input section 380 supplies an operation signal associated with the operation to the control section 370.

The control section 370 supplies, in response, for example, to an operation signal adapted to change a gamma correction curve from the operation input section 380, a control signal adapted to change the amplification factor of the amplification circuit 30 or 40 to the gray level voltage generation circuit 390. This allows the gray level voltage output from the gray level voltage generation circuit 390 to be changed to a level representing a desired gamma correction curve.

At this time, the drive circuit of the signal processing section 330 or display section 340 performs gamma correction based on the changed gray level voltage. Therefore, the image data supplied from the image sensor section 320 or that read from the recording media is gamma-corrected in a desired manner. This allows the image gamma-corrected in a desired manner to be displayed on the display section 340 or recorded to the media recording section 360.

(F) Conclusion

The display device according to the first embodiment can display an image with two or more gray levels and includes the voltage division circuit C11, gamma correction section C12, amplification circuit C14 and adjustment section C15. The voltage division circuit C11 generates a plurality of voltages using a resistance division circuit. The gamma correction section C12 gamma-corrects the image using the voltages generated at the division points of the resistance division circuit. The amplification circuit C14 amplifies a given voltage and supplies the amplified voltage to at least one of the division points of the resistance division circuit. The adjustment section C15 adjusts the amplification factor of the amplification circuit C14. This permits the gamma correction with high speed switching among a variety of gamma correction curves while at the same time keeping the increase in circuit area and power consumption to a minimum.

The display device according to the second embodiment can display an image with two or more gray levels on a display section and includes the voltage division circuit C21, gamma correction section C22 and voltage adjustment section C24. The voltage division circuit C21 generates a plurality of voltages using a resistance division circuit. The gamma correction section C22 gamma-corrects the image using the voltages generated at the division points of the resistance division circuit. The voltage adjustment section C24 increases or reduces the voltages of at least two of the division points of the resistance division circuit for adjustment. This permits the gamma correction with high speed switching among a variety of gamma correction curves while at the same time keeping the increase in circuit area and power consumption to a minimum. Further, this contributes to improved degree of freedom in adjusting the shape of a gamma correction curve.

Each of the gray level voltage generation circuits according to the third and fourth embodiments includes a voltage division circuit, the gray level voltage output section 20, amplification circuits 30 and 40 and amplification factor adjustment section 50. The voltage division circuit generates a plurality of voltages using the resistance division circuit 10. The gray level voltage output section 20 generates gray level voltages using the voltages generated at the division points of the resistance division circuit 10. Each of the amplification circuits 30 and 40 amplifies a given potential difference at a proper amplification factor, supplying to at least one of the division points of the resistance division circuit 10. The amplification factor adjustment section 50 adjusts the amplification factors of the amplification circuits 30 and 40. As a result, it is possible to output gray level voltages for a variety of gamma correction curves as appropriate. This permits the gamma correction with high speed switching among a variety of gamma correction curves while at the same time keeping the increase in circuit area and power consumption to a minimum.

It should be noted that the present technology is not limited to the above embodiments and modification examples described above, but includes those configurations in which the components disclosed in the above embodiments and modification examples are replaced with each other or the combinations thereof are altered, and those configurations in which the components disclosed in well-known art and the above embodiments and modification examples are replaced with each other or the combinations thereof are altered. Further, the technical scope of the present technology is not limited to the above embodiments but extends to the appended claims and equivalents thereof.

The present technology can have the following configurations.

(1) A display device capable of displaying an image with two or more gray levels, the display device including:

a voltage division circuit adapted to generate a plurality of voltages using a resistance division circuit;

a gamma correction section adapted to gamma-correct the image using the voltages generated at division points of the resistance division circuit;

an amplification circuit adapted to amplify a given voltage and supply the amplified voltage to at least one of the division points of the resistance division circuit; and an adjustment section adapted to adjust an amplification factor of the amplification circuit.

(2) The display device of feature 1 including:

two or more amplification circuits, in which the resistance division circuit includes at least three resistors connected in series, and the two or more amplification circuits supply a voltage obtained by amplifying the given voltage to different division points of the resistance division circuit.

(3) The display device of feature 1 or 2, in which the amplification circuit produces a low impedance output.

(4) The display device of any one of features 1 to 3, in which the amplification circuit has an operational amplifier adapted to amplify a given potential difference and output the amplified potential difference, and an output terminal of the operational amplifier is connected to one of the division points of the resistance division circuit.

(5) The display device of any one of features 1 to 4, in which the resistance division circuit connects two gray level reference voltages, and the amplification circuit has an operational amplifier adapted to amplify the given potential difference and output the amplified potential difference, an output terminal of the operational amplifier is connected to a division point higher in voltage than an intermediate voltage of the two gray level reference voltages, and the lower of the two gray level reference voltages is supplied to an inverted input terminal of the operational amplifier.

(6) The display device of any one of features 1 to 4, in which the resistance division circuit connects two gray level reference voltages, and the amplification circuit has an operational amplifier adapted to amplify the given potential difference and output the amplified potential difference, an output terminal of the operational amplifier is connected to a division point lower in voltage than an intermediate voltage of the two gray level reference voltages, and the higher of the two gray level reference voltages is supplied to an inverted input terminal of the operational amplifier.

(7) The display device of any one of features 1 to 6, in which the amplification circuit has an operational amplifier adapted to amplify the given potential difference and output the amplified potential difference, and the adjustment section adjusts the amplification factor of the amplification circuit by adjusting a ratio between a resistance of a first resistor adapted to apply negative feedback to the operational amplifier and a resistance of a second resistor connected to an inverted input terminal of the operational amplifier to supply an input.

(8) The display device of any one of features 1 to 7 further including:
a transistor voltage division circuit adapted to divide a potential difference between two gray level reference voltages using two or more transistors connected in series, in which
the resistance division circuit connects the two gray level reference voltages, and
the amplification circuit amplifies, as the given voltage, a potential difference between either of the two gray level reference voltages and the divided voltage output from the transistor voltage division circuit.

(9) The display device of feature 8, in which
the transistor voltage division circuit includes two transistors, and
the two transistors making up the transistor voltage division circuit have a same aspect ratio.

(10) The display device of feature 8, in which
the transistor voltage division circuit includes two transistors, and
the two transistors making up the transistor voltage division circuit have a same size.

(11) A display device capable of displaying an image with two or more gray levels on a display section, the display device including:
a voltage division circuit adapted to generate a plurality of voltages using a resistance division circuit;
a gamma correction section adapted to gamma-correct the image using the voltages generated at division points of the resistance division circuit; and
a voltage adjustment section adapted to increase or reduce the voltages generated at least two of the division points of the resistance division circuit for adjustment.

(12) An imaging device capable of imaging a subject and generating a gray level image, the imaging device including:
a voltage division circuit adapted to generate a plurality of voltages using a resistance division circuit;
a gamma correction section adapted to gamma-correct the gray level image using the voltages generated at division points of the resistance division circuit;
an amplification circuit adapted to amplify a given potential difference and supply the amplified potential difference to at least one of the division points of the resistance division circuit; and an adjustment section adapted to adjust an amplification factor of the amplification circuit.

(13) A gray level voltage generation circuit including:
a voltage division circuit adapted to generate a plurality of voltages using a resistance division circuit;
a gray level voltage generation section adapted to generate a gray level voltage using the voltages generated at division points of the resistance division circuit;
an amplification circuit adapted to amplify a given potential difference and supply the amplified potential difference to at least one of the division points of the resistance division circuit; and
an adjustment section adapted to adjust an amplification factor of the amplification circuit.

The present disclosure contains subject matter related to that disclosed in Japanese Priority Patent Application JP 2012-127863 filed in the Japan Patent Office on Jun. 5, 2012, the entire content of which is hereby incorporated by reference.

What is claimed is:

1. A display device capable of displaying an image with two or more gray levels, the display device comprising:
a voltage division circuit adapted to generate a plurality of voltages using a resistance division circuit that connects two signal lines respectively having two gray level reference voltages;
a gamma correction section adapted to gamma-correct the image using the voltages generated at division points of the resistance division circuit;
an amplification circuit including an operational amplifier adapted to amplify a given voltage and supply the amplified voltage to at least one of the division points of the resistance division circuit; and
an adjustment section adapted to adjust an amplification factor of the amplification circuit,
wherein an output terminal of the operational amplifier is connected to a first division point with a first voltage relative to an intermediate voltage of the two gray level reference voltages, and a second voltage of the two gray level reference voltages is supplied to an inverted input terminal of the operational amplifier, the second voltage being different from the first voltage.

2. The display device of claim 1 comprising:
two or more amplification circuits, wherein
the resistance division circuit includes at least three resistors connected in series, and
the two or more amplification circuits supply a voltage obtained by amplifying the given voltage to different division points of the resistance division circuit.

3. The display device of claim 1, wherein
the amplification circuit produces a low impedance output.

4. The display device of claim 1, wherein the first division point is a division point higher in voltage than the intermediate voltage of the two gray level reference voltages, and the second voltage is the lower of the two gray level reference voltages.

5. The display device of claim 1, wherein
the first division point is a division point lower in voltage than the intermediate voltage of the two gray level reference voltages, and the second voltage is the higher of the two gray level reference voltages.

6. The display device of claim 1, wherein
the adjustment section adjusts the amplification factor of the amplification circuit by adjusting a ratio between a resistance of a first resistor adapted to apply negative feedback to the operational amplifier and a resistance of a second resistor connected to an inverted input terminal of the operational amplifier to supply an input.

7. A display capable of displaying an image with two or more gray levels, the display device comprising:
a voltage division circuit adapted to generate a plurality of voltages using a resistance division circuit;
a gamma correction section adapted to gamma-correct the image using the voltages generated at division points of the resistance division circuit;
an amplification circuit adapted to amplify a given voltage and supply the amplified voltage to at least one of the division points of the resistance division circuit;
an adjustment section adapted to adjust an amplification factor of the amplification circuit; and
a transistor voltage division circuit adapted to divide a potential difference between two gray level reference voltages using two or more transistors connected in series, wherein
the resistance division circuit connects the two gray level reference voltages, and
the amplification circuit amplifies, as the given voltage, a potential difference between either of the two gray level reference voltages and the divided voltage output from the transistor voltage division circuit.

8. The display device of claim 7, wherein
the transistor voltage division circuit includes two transistors, and
the two transistors making up the transistor voltage division circuit have a same aspect ratio.

9. The display device of claim 7, wherein
the transistor voltage division circuit includes two transistors, and
the two transistors making up the transistor voltage division circuit have a same size.

10. An imaging device capable of imaging a subject and generating a gray level image, the imaging device comprising:
a voltage division circuit adapted to generate a plurality of voltages using a resistance division circuit that connects two signal lines respectively having two gray level reference voltages;
a gamma correction section adapted to gamma-correct the gray level image using the voltages generated at division points of the resistance division circuit;
an amplification circuit including an operational amplifier adapted to amplify a given voltage and supply the amplified voltage to at least one of the division points of the resistance division circuit; and
an adjustment section adapted to adjust an amplification factor of the amplification circuit,
wherein an output terminal of the operational amplifier is connected to a first division point with a first voltage relative to an intermediate voltage of the two gray level reference voltages, and a second voltage of the two gray level reference voltages is supplied to an inverted input terminal of the operational amplifier, the second voltage being different from the first voltage.

11. The imaging device of claim 10, wherein the first division point is a division point higher in voltage than the intermediate voltage of the two gray level reference voltages, and the second voltage is the lower of the two gray level reference voltages.

12. The imaging device of claim 10, wherein the first division point is a division point lower in voltage than the intermediate voltage of the two gray level reference voltages, and the second voltage is the higher of the two gray level reference voltages.

13. The imaging device of claim 10 comprising:
two or more amplification circuits, wherein
the resistance division circuit includes at least three resistors connected in series, and
the two or more amplification circuits supply a voltage obtained by amplifying the given voltage to different division points of the resistance division circuit.

14. The imaging device of claim 10, wherein
the amplification circuit produces a low impedance output.

15. A gray level voltage generation circuit comprising:
a voltage division circuit adapted to generate a plurality of voltages using a resistance division circuit that connects two signal lines respectively having two gray level reference voltages;
a gray level voltage generation section adapted to generate a gray level voltage using the voltages generated at division points of the resistance division circuit;
an amplification circuit including an operational amplifier adapted to amplify a given voltage and supply the amplified voltage to at least one of the division points of the resistance division circuit; and
an adjustment section adapted to adjust an amplification factor of the amplification circuit,
wherein an output terminal of the operational amplifier is connected to a first division point with a first voltage relative to an intermediate voltage of the two gray level reference voltages, and a second voltage of the two gray level reference voltages is supplied to an inverted input terminal of the operational amplifier, the second voltage being different from the first voltage.

16. The gray level voltage generation circuit of claim 15, wherein the first division point is a division point higher in voltage than the intermediate voltage of the two gray level reference voltages, and the second voltage is the lower of the two gray level reference voltages.

17. The gray level voltage generation circuit of claim 15, wherein the first division point is a division point lower in voltage than the intermediate voltage of the two gray level reference voltages, and the second voltage is the higher of the two gray level reference voltages.

18. The gray level voltage generation circuit of claim 15 comprising:
two or more amplification circuits, wherein
the resistance division circuit includes at least three resistors connected in series, and
the two or more amplification circuits supply a voltage obtained by amplifying the given voltage to different division points of the resistance division circuit.

19. The gray level voltage generation circuit of claim 15, wherein
the amplification circuit produces a low impedance output.

* * * * *